(12) United States Patent
Oh et al.

(10) Patent No.: US 12,046,706 B2
(45) Date of Patent: Jul. 23, 2024

(54) BATTERY PACK MANUFACTURING DEVICE AND MANUFACTURING METHOD OF BATTERY PACK

(71) Applicant: LG CHEM, LTD., Seoul (KR)

(72) Inventors: Jung Ho Oh, Daejeon (KR); Ju Hwan Baek, Daejeon (KR); Geon Tae Park, Daejeon (KR); Hyeong Min Park, Daejeon (KR); Seok Won Jeung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 650 days.

(21) Appl. No.: 17/273,899

(22) PCT Filed: Jan. 21, 2020

(86) PCT No.: PCT/KR2020/001005
§ 371 (c)(1),
(2) Date: Mar. 5, 2021

(87) PCT Pub. No.: WO2020/180009
PCT Pub. Date: Sep. 10, 2020

(65) Prior Publication Data
US 2021/0242486 A1     Aug. 5, 2021

(30) Foreign Application Priority Data
Mar. 7, 2019 (KR) .......................... 10-2019-0026500

(51) Int. Cl.
*H01M 10/04* (2006.01)
*H01M 50/213* (2021.01)
(Continued)

(52) U.S. Cl.
CPC ..... *H01M 10/0404* (2013.01); *H01M 50/213* (2021.01); *H01M 50/244* (2021.01); *H01M 50/264* (2021.01)

(58) Field of Classification Search
CPC ........... H01M 10/0404; H01M 50/213; H01M 50/244; H01M 50/264; H01M 50/204; Y02E 60/10; Y02P 70/50
See application file for complete search history.

(56) References Cited

U.S. PATENT DOCUMENTS 6,324,751 B1    12/2001  Barge et al.
2012/0133371 A1  5/2012  Toomre et al.

FOREIGN PATENT DOCUMENTS

CN      103794807 A    5/2014
CN      203707268 U    7/2014
(Continued)

OTHER PUBLICATIONS

International Search Report for PCT/KR2020/001005 mailed on May 6, 2020.
(Continued)

*Primary Examiner* — Daniel S Gatewood
(74) *Attorney, Agent, or Firm* — Birch, Stewart, Kolasch & Birch, LLP

(57) ABSTRACT

A battery pack manufacturing device includes a transferring part for transferring a plurality of unit cells, an adjusting part for adjusting a position of a pack frame in which the unit cells are accommodated, and a vertical pressing part that vertically presses the unit cells accommodated in the pack frame. The transferring part includes a seating part on which the unit cells are seated. The unit cells are vertically dropped and mounted in accommodating parts of the frame when an opening and closing part of each seating part is opened.

13 Claims, 5 Drawing Sheets

(51) Int. Cl.
*H01M 50/244* (2021.01)
*H01M 50/264* (2021.01)

(56) References Cited

FOREIGN PATENT DOCUMENTS

| | | |
|---|---|---|
| CN | 107195950 A | 9/2017 |
| JP | 2001-176453 A | 6/2001 |
| JP | 2018-37373 A | 3/2018 |
| KR | 10-1997-0013445 A | 3/1997 |
| KR | 10-1997-0024334 A | 5/1997 |
| KR | 10-1997-0054612 A | 7/1997 |
| KR | 10-1997-0054642 A | 7/1997 |
| KR | 10-1997-0054671 A | 7/1997 |
| KR | 970054671 A * | 7/1997 |
| KR | 10-0177212 B1 | 5/1999 |
| KR | 10-1309132 B1 | 9/2013 |
| KR | 101309132 B1 * | 9/2013 |
| KR | 10-2016-0049709 A | 5/2016 |
| KR | 10-2016-0087152 A | 7/2016 |
| KR | 10-2016-0089156 A | 7/2016 |
| KR | 10-2017-0062901 A | 6/2017 |
| KR | 10-2019-0010229 A | 1/2019 |

OTHER PUBLICATIONS

Extended European Search Report for corresponding European Application No. 20765760.2, dated Oct. 4, 2021.

* cited by examiner

[FIG. 1]
Conventional Art
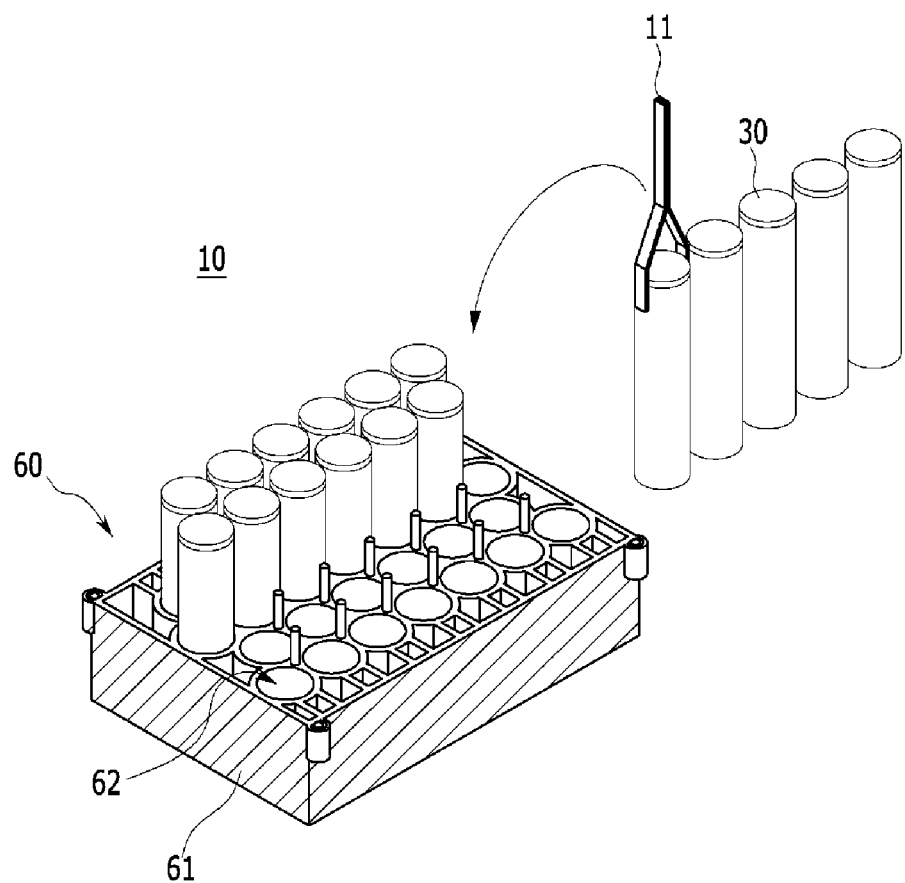

[FIG. 2]
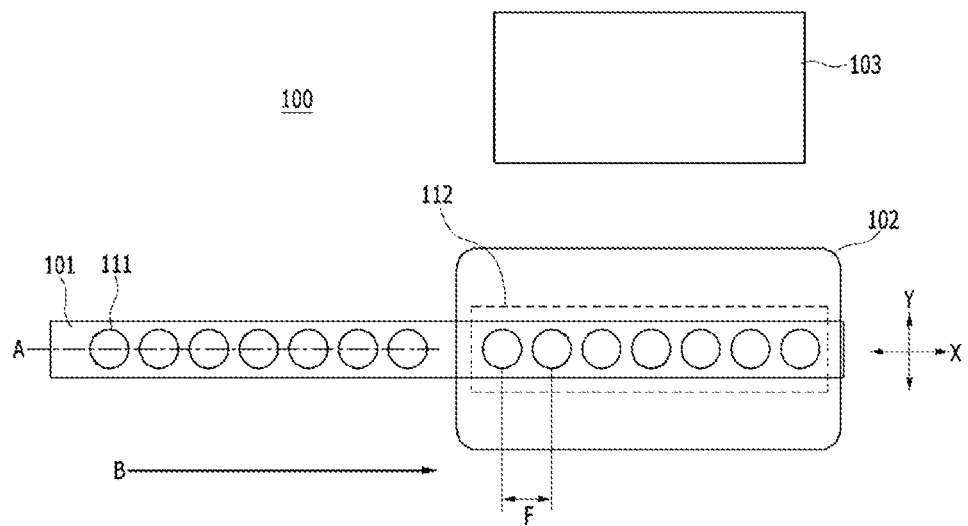

[FIG. 3]
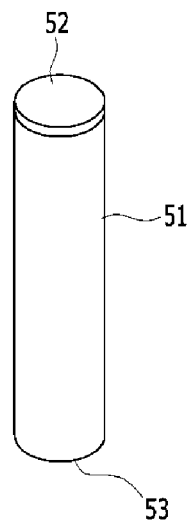
[FIG. 4]
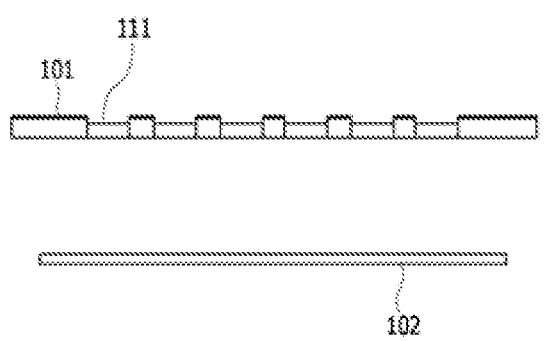

【FIG. 5】
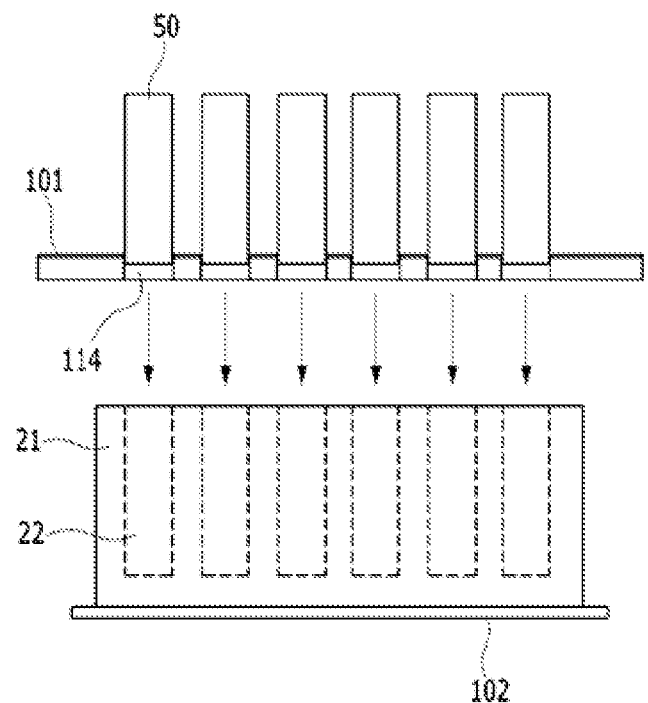

[FIG. 6]
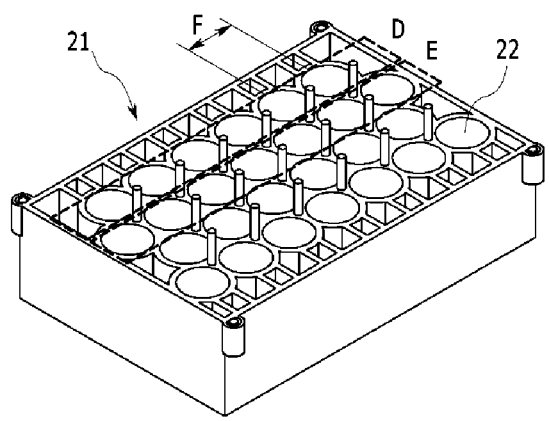
[FIG. 7]
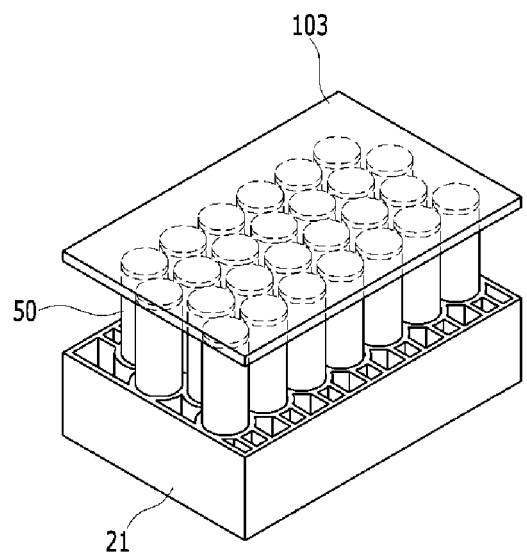

BATTERY PACK MANUFACTURING DEVICE AND MANUFACTURING METHOD OF BATTERY PACK

TECHNICAL FIELD

Cross Citation with Related Application (s)

This application claims the benefit of Korean Patent Application No. 10-2019-0026500 filed on Mar. 7, 2019 with the Korean Intellectual Property Office, the disclosure of which is incorporated herein by reference in its entirety.

The present disclosure relates to a battery pack manufacturing device and a battery pack manufacturing method.

BACKGROUND ART

As energy prices are increasing due to the depletion of fossil fuels and increasing attention is being paid to environmental pollution, the demand for environmentally-friendly alternative acts as energy sources an indispensable factor for future life. Thus, research into techniques for generating various kinds of power, such as nuclear energy, solar energy, wind energy, and tidal power, is underway, and power storage apparatuses for more efficient use of the generated energy are also drawing much attention.

Moreover, the demand for batteries as energy sources is rapidly increasing as mobile device technology continues to develop and the demand for such mobile devices continues to increase. Accordingly, much research on batteries satisfying various needs has been carried out. In particular, in terms of the material for batteries, the demand for lithium secondary batteries, such as lithium ion batteries and lithium ion polymer batteries, which have advantages such as high energy density, discharge voltage, and output stability, is very high.

In addition, secondary batteries may be classified based on the structure of an electrode assembly having a structure in which a positive electrode and a negative electrode are stacked in the state in which a separator is interposed between the positive electrode and the negative electrode. For example, the electrode assembly may be configured to have a jelly-roll (wound) type structure in which a long sheet type positive electrode and a long sheet type negative electrode are wound in the state in which a separator is disposed between the positive electrode and the negative electrode or a stacked type structure in which pluralities of positive electrodes and negative electrodes each having a predetermined size are sequentially stacked in the state in which separators are disposed respectively between the positive electrodes and the negative electrodes. In recent years, in order to solve problems caused by the jelly-roll type electrode assembly and the stacked type electrode assembly, there has been developed a stacked/folded type electrode assembly, which is a combination of the jelly roll type electrode assembly and the stacked type electrode assembly, having an improved structure in which predetermined numbers of positive electrodes and negative electrodes are sequentially stacked in the state in which separators are disposed respectively between the positive electrodes and the negative electrodes to constitute a unit cell, after which a plurality of unit cells is sequentially folded in the state of having been placed on a separation film.

These electrode assemblies are accommodated in a pouch case, a cylindrical can, a prismatic case, etc. depending on the purpose of use to produce a battery.

Among them, the cylindrical battery has the advantages of being easy to manufacture and having a high energy density per weight, and thus, is used as an energy source for various devices ranging from portable computers to electric vehicles.

FIG. 1 is a schematic view showing that a cylindrical unit cell is accommodated in a pack frame using conventional cylindrical battery pack manufacturing device.

Referring to FIG. 1, the conventional cylindrical battery pack manufacturing device 10 manufactures a cylindrical battery pack 60 by mounting a cylindrical unit cell 30 in an accommodating part 62 of a pack frame 61 by using moving tongs 11. In general, the cylindrical battery pack 60 includes a plurality of cylindrical unit cells 30, and thus, when moving the unit cell 30 using the moving tongs 11 to be mounted in the accommodating part 62, there are problems that it takes a lot of time and, further, friction occurs at a contact portion between the moving tongs 11 and the cylindrical unit cell 30, thereby damaging an appearance of the cylindrical unit cell 30.

DETAILED DESCRIPTION OF THE INVENTION

Technical Problem

The present disclosure has been made to solve the above problems and other technical problems that have yet to be resolved.

As a result of repeated in-depth studies and various experiments, the inventors of the present application have found that, as described later, a plurality of unit cells transferred by a transferring part are vertically dropped and accommodated in accommodating parts of a pack frame, thereby preventing damage to an appearance of the unit cells and reducing the manufacturing time. The present disclosure has been completed on the basis of such findings.

Technical Solution

According to the present disclosure for achieving the above object, there is provided a battery pack manufacturing device comprising: a transferring part configured to transfer a plurality of unit cells to a pack frame, the pack frame including a plurality of accommodating parts to receive the unit cells; an adjusting part configured to adjust a position of the pack frame; and a vertical pressing part configured to vertically press the unit cells into the pack frame, wherein the transferring part includes a plurality of seating parts on which the unit cells are seated, each seating part having an opening and closing part, and wherein the unit cells may be vertically dropped and mounted in the accommodating parts of the frame when the opening and closing parts of the seating parts are opened.

The unit cells may be simultaneously mounted in the accommodating parts of the pack frame.

Each seating part may have an indentation shape corresponding to an external shape of a corresponding unit cell.

Each opening and closing part may be formed on a bottom surface of each seating part.

The seating parts may be formed along a longitudinal direction of the transferring part.

A spacing between adjacent seating parts may be formed to be equal to a spacing between adjacent accommodating parts.

The transferring part may be configured to stop at a vertical dropping point.

The pack frame may be located in the adjusting part.

The pack frame may be located below the transferring part at the vertical dropping point.

The adjusting part may be configured to adjust a position of the pack frame so that the unit cells positioned at the vertical dropping point are vertically dropped and accommodated in the accommodating parts of the pack frame.

A battery pack manufacturing method according to the present disclosure may include the steps of: positioning a plurality of unit cells in a plurality of seating parts formed in a transferring part, each seating part having an opening and closing part; positioning a pack frame having a plurality of accommodating parts in an adjusting part; transferring the unit cells seated on the transferring part to a vertical dropping point; and opening the opening and closing parts of the seating parts and vertically dropping the unit cells into the accommodating parts.

The battery pack manufacturing method may further include a step of adjusting a position of the pack frame by the adjusting part so that the unit cells at the vertical dropping point are vertically dropped and accommodated in the accommodating parts of the pack frame.

The battery pack manufacturing method may further include a step of pressing an upper surface of the unit cells accommodated in the pack frame using a vertical pressing part.

Advantageous Effects

As described above, in the battery pack manufacturing device according to an embodiment of the present disclosure, a plurality of unit cells transferred by a transferring part are vertically dropped and inserted into an accommodating part of a pack frame, thereby preventing damage to the unit cells as well as reducing the manufacturing time and simplifying the manufacturing process.

BRIEF DESCRIPTION OF THE DRAWINGS

FIG. 1 is a schematic view showing that a cylindrical unit cell is mounted in a pack frame using a conventional cylindrical battery pack manufacturing device.

FIG. 2 is a plan view of a battery pack manufacturing device according to one embodiment of the present disclosure.

FIG. 3 is a schematic view of a unit cell in FIG. 2.

FIG. 4 is a partial cross-sectional view taken along a dashed line A in FIG. 2.

FIG. 5 is a schematic view showing that a unit cell in the embodiment of FIG. 2 is dropped and accommodated in a pack frame.

FIG. 6 is a schematic view of a pack frame in FIG. 2.

FIG. 7 is a schematic view showing that a vertical pressing part acts in the embodiment of FIG. 2.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Further, throughout the specification, when a part is referred to as "including" a certain component, it means that it can further include other components, without excluding the other components, unless otherwise stated.

Further, throughout the specification, the phrase "in a cross-sectional view" means viewing a cross-section of which the object portion is vertically cut from the side.

Throughout the specification, the phrase "in a plan view" means viewing the object portion from the top.

FIG. 2 is a plan view of a battery pack manufacturing device according to one embodiment of the present disclosure. FIG. 3 is a schematic view of a unit cell in FIG. 2. FIG. 4 is a partial cross-sectional view taken along a dashed line A in FIG. 2.

Referring to FIGS. 2 to 4, a battery pack manufacturing device 100 may include a transferring part 101, an adjusting part 102, and a vertical pressing part 103. The adjusting part 102 may be located below the transferring part 101. More specifically, the adjusting part 102 may be located below a vertical dropping point 112 of the transferring part 101. In addition, the vertical pressing part 103 may be positioned adjacent to the adjusting part 102.

The transferring part 101 may continuously transfer a unit cell 50, and may be, for example, a conveyor. The transferring part 101 may include a seating part 111 on which the unit cell 50 can be seated, and the unit cell 50 may move in a first moving direction B in a state located in the seating part 111.

The unit cell 50 may have a cylindrical shape with a structure in which a side surface 51 is formed between an upper surface 52 and a lower surface 53. The unit cell 50 may be positioned in the seating part 111 in a standing state in which the lower surface 53 of the unit cell 50 makes contact with the seating part 111. Further, the unit cell 50 may be accommodated in a state in which its lower surface 53 makes contact with a bottom surface of an accommodating part 22 of a pack frame 21.

FIG. 5 is a schematic view showing that the unit cell in the embodiment of FIG. 2 is dropped and accommodated in the pack frame.

Referring to FIGS. 4 and 5, the seating part 111 may be formed in an indentation shape corresponding to a portion of an external shape of the unit cell 50 so that a portion of the unit cell 50 can be accommodated. For example, the seating part 111 may be a cylindrical indentation corresponding to the lower surface 53 of the unit cell 50. A plurality of seating parts 111 may be formed along a longitudinal direction of the transferring part 101 having a long length compared to the width. The unit cell 50 located in the seating part 111 does not deviate from the position when the transferring part 101 moves. Thus, the worker can improve an efficiency of the work by increasing a moving speed of the transferring part 101. The spacing between the seating parts 111 and the number of the seating parts 111 may be variously determined depending on the number of the accommodating parts 22 of the pack frame 21 and the spacing between them.

FIG. 6 is a schematic view of a pack frame in FIG. 2.

Referring to FIGS. 2, 5 and 6, the seating parts 111 may be formed along a longitudinal direction of the transferring part 101 in a spacing identical with a spacing F between the accommodating parts 22 at one row D of the pack frame 21. When the unit cells 50 to be accommodated in one row D of the pack frame 21 reach the vertical dropping point 112 by the transferring part 101, the transferring part 101 may stop. In addition, the unit cells 50 may stop at a position corresponding to the accommodating parts 22 in one row D of the pack frame 21.

The pack frame 21 may be positioned below the vertical dropping point 112 of the transferring part 101. The pack frame 21 may be positioned so as to allow the surface on which the accommodating parts 22 are formed to face the unit cells 50 positioned at the vertical dropping point 112 in the state of being located in the adjusting part 102.

The adjusting part 102 may adjust a position of the pack frame 21 in a X direction and in a Y direction so that the unit cells 50 can be dropped vertically and accommodated in the accommodating parts 22. Here, the direction of "being dropped vertically" means a direction which is perpendicular to the X direction and the Y direction and in which gravity acts.

When the unit cells 50 are positioned at the vertical dropping point 112 by the transferring part 101, and the position of the unit cells 50 and the accommodating parts 22 in one row D is aligned by the adjusting part 102, an opening and closing part 114 of the seating part 111 is opened and the unit cells 50 are vertically dropped such that they can be accommodated in the accommodating parts 22.

Further, when the unit cells 50 are again transferred by the transferring part 101 and positioned at the vertical dropping point 112, the position of the pack frame 21 is adjusted by the adjusting part 102 to align the position of the accommodating part 22 at another row E and the unit cells 50; and the opening and closing part 114 of the seating part 111 is opened and the unit cells 50 are vertically dropped such that they can be accommodated in the accommodating parts 22.

By repeating such a process, the unit cells 50 can be accommodated in the accommodating parts 22 of the pack frame 21. The number of unit cells 50 accommodated at one time while the opening and closing part 114 being opened may be variously determined depending on the arrangement and number of the accommodating parts 22 of the pack frame 21.=

FIG. 7 is a schematic view showing that a vertical pressing part acts in the embodiment of FIG. 2.

Referring to FIGS. 2 and 7, when the unit cells 50 are all accommodated in the pack frame 21, the adjusting part 102 may move the pack frame 21 below the transferring part 101 to the outside. In addition, the vertical pressing part 103 presses the unit cells 50 on the upper surface 52 thereof in a vertically dropping direction so that the lower surface 53 of the unit cells 50 can be in close contact with the bottom surface of the accommodating 22.

By such structure, the unit cell 50 can be quickly accommodated in the accommodating part 22 without damaging an appearance of the unit cell 50.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack manufacturing device comprising:
    a transferring part configured to transfer a plurality of unit cells to a pack frame, the pack frame including a plurality of accommodating parts to receive the unit cells;
    an adjusting part configured to adjust a position of the pack frame; and
    a vertical pressing part configured to vertically press the unit cells into the pack frame,
    wherein the transferring part includes a plurality of seating parts on which the unit cells are seated, each seating part having an opening and closing part located therein,
    wherein the unit cells are vertically dropped and mounted in the accommodating parts of the pack frame when the opening and closing parts of the seating parts are opened, and
    wherein the vertical pressing part vertically presses the unit cells after being vertically dropped and mounted in the accommodating parts of the pack frame.

2. The battery pack manufacturing device of claim 1, wherein the unit cells are simultaneously mounted in the accommodating parts of the pack frame.

3. The battery pack manufacturing device of claim 1, wherein each seating part has an indentation shape corresponding to an external shape of a corresponding unit cell.

4. The battery pack manufacturing device of claim 3, wherein each opening and closing part is formed on a bottom surface of each seating part.

5. The battery pack manufacturing device of claim 1, wherein the seating parts are formed along a longitudinal direction of the transferring part.

6. The battery pack manufacturing device of claim 5, wherein a spacing between adjacent seating parts is equal to a spacing between adjacent accommodating parts.

7. The battery pack manufacturing device of claim 1, wherein the transferring part is configured to stop at a vertical dropping point.

8. The battery pack manufacturing device of claim 7, wherein the pack frame is located in the adjusting part.

9. The battery pack manufacturing device of claim 8, wherein the pack frame is located below the transferring part at the vertical dropping point.

10. The battery pack manufacturing device of claim 9, wherein the adjusting part is configured to adjust a position of the pack frame so that the unit cells positioned at the vertical dropping point are vertically dropped and mounted in the accommodating parts of the pack frame.

11. A battery pack manufacturing method using the battery pack manufacturing device of claim 1, the method comprising the steps of:
    positioning a plurality of unit cells in the plurality of seating parts in the transferring part;
    positioning a pack frame having a plurality of accommodating parts in the adjusting part;
    transferring the unit cells seated on the transferring part to a vertical dropping point; and
    opening the opening and closing parts of the seating parts and vertically dropping the unit cells into the accommodating parts.

12. The battery pack manufacturing method according to claim 11, further comprising a step of adjusting a position of the pack frame by the adjusting part so that the unit cells at the vertical dropping point are vertically dropped and accommodated in the accommodating parts of the pack frame.

13. The battery pack manufacturing method according to claim 11, further comprising a step of pressing an upper surface of the unit cells accommodated in the pack frame using the vertical pressing part.

* * * * *